(12) United States Patent
Vaish et al.

(10) Patent No.: US 9,785,721 B2
(45) Date of Patent: Oct. 10, 2017

(54) SYSTEM AND METHOD FOR PROGRAMMATICALLY CREATING RESOURCE LOCATORS

(71) Applicant: YAHOO HOLDINGS, INC., Sunnyvale, CA (US)

(72) Inventors: Gaurav Vaish, San Jose, CA (US); Daryl Low, San Jose, CA (US); Sanchan Saxena, Sunnyvale, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 287 days.

(21) Appl. No.: 14/586,032

(22) Filed: Dec. 30, 2014

(65) Prior Publication Data
US 2016/0188743 A1    Jun. 30, 2016

(51) Int. Cl.
*G06F 17/30* (2006.01)
*H04L 29/08* (2006.01)

(52) U.S. Cl.
CPC .. *G06F 17/30887* (2013.01); *G06F 17/30292* (2013.01); *H04L 67/02* (2013.01)

(58) Field of Classification Search
USPC ............... 707/755; 704/2, 255, 235, 9, 231; 709/245
See application file for complete search history.

(56) References Cited

U.S. PATENT DOCUMENTS 9,460,088 B1 * 10/2016 Sak ..................... G06F 17/2881
2008/0320167 A1 * 12/2008 Collignon ......... G06F 17/30887
709/245

OTHER PUBLICATIONS

URL Transforms—AppURL; http://appurl.org/docs/url-transforms; Nov. 30, 2014; 5 pages.

* cited by examiner

*Primary Examiner* — Hung T Vy
(74) *Attorney, Agent, or Firm* — James J. DeCarlo; Greenberg Traurig, LLP

(57) ABSTRACT

An output resource identifier, such as a universal resource locator (URL), may be programmatically generated using one or more recomposition rules and decomposed parts of a source, or input, URL. The decomposed parts may be programmatically generated using one or more decomposition rules. The input and output URLs may comprise one or more of web and/or native URLs.

30 Claims, 15 Drawing Sheets

302 — INPUT URL = HTTP://FINANCE.YAHOO.COM/Q?S=YHOO
INPUT VALUES = NONE

304 — OUTPUT={PROTOCOL=HTTP, HOST=FINANCE.YAHOO.COM, PATH=/Q, S=YHOO}
CONFIDENCE LEVEL = LOW

306 — INPUT URL = HTTP://FINANCE.YAHOO.COM/Q?S=YHOO
INPUT VALUES = {PROTOCOL=HTTP, HOST=FINANCE.YAHOO.COM, PATH=/Q, S=YHOO}

308 — OUTPUT={SYMBOL=YHOO, TYPE=STOCK QUOTE}
CONFIDENCE LEVEL = HIGH

Fig. 3

INPUT URL:
HTTP://NEWS.YAHOO.COM/TENEMENT-MUSEUM-USES-NOVEL-WAY-TEACH-ENGLISH-133533341.HTML

DOMAIN DECOMPOSITION RULE

INPUT = INPUT URL.
RULE DEFINITION: CHECKS IF THE DOMAIN IS "YAHOO.COM". IN THIS CASE, IT RETURNS TRUE.

DECOMPOSES INTO:

| PART NAME | PART VALUE | MEANING |
|---|---|---|
| SCHEME | HTTP | URL SCHEME |
| HOST | NEWS.YAHOO.COM | URL HOST |
| DOMAIN | YAHOO.COM | 2ND LEVEL DOMAIN NAME FROM THE HOST |
| SUBDOMAIN | NEWS | SUBDOMAIN PART FROM THE HOST |
| PATH | /TENEMENT-MUSEUM-USES-NOVEL-WAY-TEACH-ENGLISH-133533341.HTML | URL PATH |

Fig. 5

INPUT URL:
HTTP://NEWS.YAHOO.COM/TENEMENT-MUSEUM-USES-NOVEL-WAY-TEACH-ENGLISH-133533341.HTML

REGULAR EXPRESSION DECOMPOSITION RULE

INPUT = INPUT URL + DECOMPOSED PARTS FROM PREVIOUS RULE
RULE DEFINITION: CHECKS IF THE DOMAIN IS "YAHOO.COM" AND SUBDOMAIN = "NEWS" AND SCHEME = "HTTP" OR "HTTPS". IN THIS CASE, IT RETURNS TRUE.

REGULAR EXPRESSION:
"HTTPS?:\/\/NEWS\.YAHOO\.COM\/(\W\/)?(\W+)\-(\d+)\.HTML$ => TYPE=$1 ?? ARTICLE, ALIAS =$2, ID=$3

DECOMPOSES INTO THE FOLLOWING ADDITIONAL PARTS:

| PART NAME | PART VALUE | MEANING |
|---|---|---|
| TYPE | ARTICLE | TYPE OF THE CONTENT REPRESENTED BY THE URL |
| ALIAS | /TENEMENT-MUSEUM-USES-NOVEL-WAY-TEACH-ENGLISH | ALIAS |
| ID | 133533341 | ARTICLE ID |

*Fig. 6*

INPUT URL:
HTTP://NEWS.YAHOO.COM/TENEMENT-MUSEUM-USES-NOVEL-WAY-TEACH-ENGLISH-133533341.HTML

DECOMPOSES INTO:

| PART NAME | PART VALUE | MEANING |
|---|---|---|
| SCHEME | HTTP | URL SCHEME |
| HOST | NEWS.YAHOO.COM | URL HOST |
| DOMAIN | YAHOO.COM | 2$^{ND}$ LEVEL DOMAIN NAME FROM THE HOST |
| SUBDOMAIN | NEWS | SUBDOMAIN PART FROM THE HOST |
| PATH | /TENEMENT-MUSEUM-USES-NOVEL-WAY-TEACH-ENGLISH-133533341.HTML | URL PATH |
| TYPE | ARTICLE | TYPE OF THE CONTENT REPRESENTED BY THE URL |
| ALIAS | /TENEMENT-MUSEUM-USES-NOVEL-WAY-TEACH-ENGLISH | ALIAS |
| ID | 133533341 | ARTICLE ID |

*Fig. 7*

INPUT URL:
HTTP://NEWS.YAHOO.COM/VIDEO/FAMILY-39-DOG-CREDITED-SAVING-141554585.HTML

DECOMPOSES INTO:

| PART NAME | PART VALUE | MEANING |
|---|---|---|
| SCHEME | HTTP | URL SCHEME |
| HOST | NEWS.YAHOO.COM | URL HOST |
| DOMAIN | YAHOO.COM | 2ND LEVEL DOMAIN NAME FROM THE HOST |
| SUBDOMAIN | NEWS | SUBDOMAIN PART FROM THE HOST |
| PATH | FAMILY-39-DOG-CREDITED-SAVING-141554585.HTML | URL PATH |
| TYPE | VIDEO | TYPE OF THE CONTENT REPRESENTED BY THE URL |
| ALIAS | FAMILY-39-DOG-CREDITED-SAVING | ALIAS |
| ID | 141554585 | ARTICLE ID |

Fig. 8

| PARAMETER NAME | PARAMETER VALUE |
| --- | --- |
| TYPE | ARTICLE |
| ARTICLE_ID | 133533341 |
| ACTION | VIEW |
| ALIAS | TENEMENT-MUSEUM-USES-NOVEL-WAY-TEACH-ENGLISH |

*Fig. 9A*

| PARAMETER NAME | PARAMETER VALUE |
| --- | --- |
| TYPE | VIDEO |
| ARTICLE_ID | 141554585 |
| ACTION | VIEW |
| ALIAS | FAMILY-39-DOG-CREDITED-SAVING |

*Fig. 9B*

DEVICE INFORMATION:
ANDROID V4.4 WITH YAHOO APP (HTTPS://PLAY.GOOGLE.COM/STORE/APPS/DETAILS?ID=COM.YAHOO.MOBILE.CLIENT.ANDROID.YAHOO) INSTALLED

RECOMPOSITION RULE USES THE FOLLOWING TRANSCODING:

APP = YAHOO FOR ANDROID
URL TEMPLATE = YAHOO://{TYPE}/{ACTION}/{ARTICLE_ID}

RECOMPOSITION EXAMPLES:

YAHOO://ARTICLE/VIEW/133533341
YAHOO://VIDEO/VIEW/141554585

*Fig. 10*

CASE 1 - ARTICLE

| TARGET DEVICE | URL TEMPLATE | URL OUTPUT |
|---|---|---|
| ANDROID WITH YAHOO APP | YAHOO://{TYPE}/{ACTION}/ARTICLE_ID} | YAHOO://ARTICLE/VIEW/133533341 |
| IOS WITH YAHOO APP | YAHOO://{TYPE}/{ACTION}/ARTICLE_ID} | YAHOO://ARTICLE/VIEW/133533341 |
| DESKTOP WITH BROWSER APP | TYPE=ARTICLE =>HTTP://NEWS.YAHOO.COM/{ALIAS}-{ARTICLE_ID}.HTML ELSE => HTTP://NEWS.YAHOO.COM/{TYPE}/{ALIAS}-{ARTICLE_ID}.HTML | HTTP://NEWS.YAHOO.COM/TENEMENT-MUSEUM-USES-NOVEL-WAY-TEACH-ENGLISH-133533341.HTML |

CASE 2 - VIDEO

| TARGET DEVICE | URL TEMPLATE | URL OUTPUT |
|---|---|---|
| ANDROID WITH YAHOO APP | YAHOO://{TYPE}/{ACTION}/ARTICLE_ID} | YAHOO://VIDEO/VIEW/133533341 |
| IOS WITH YAHOO APP | YAHOO://{TYPE}/{ACTION}/ARTICLE_ID} | YAHOO://VIDEO/VIEW/133533341 |
| DESKTOP WITH BROWSER APP | TYPE=ARTICLE =>HTTP://NEWS.YAHOO.COM/{ALIAS}-{ARTICLE_ID}.HTML ELSE => HTTP://NEWS.YAHOO.COM/{TYPE}/{ALIAS}-{ARTICLE_ID}.HTML | HTTP://NEWS.YAHOO.COM/VIDEO/FAMILY-39-DOG-CREDITED-SAVING-141554585.HTML |

*Fig. 11*

CASE 1 – ARTICLE

| TARGET DEVICE | URLS OUTPUT |
| --- | --- |
| ANDROID | APP INSTALLED=> YAHOO://ARTICLE/VIEW/133533341<br>APP NOT INSTALLED=> HTTP://NEWS.YAHOO.COM/TENEMENT-MUSEUM-USES-NOVEL-WAY-TEACH-ENGLISH-133533341.HTML |
| IOS | APP INSTALLED=> YAHOO://ARTICLE/VIEW/133533341<br>APP NOT INSTALLED=> HTTP://NEWS.YAHOO.COM/TENEMENT-MUSEUM-USES-NOVEL-WAY-TEACH-ENGLISH-133533341.HTML |
| DESKTOP WITH BROWSER APP | HTTP://NEWS.YAHOO.COM/TENEMENT-MUSEUM-USES-NOVEL-WAY-TEACH-ENGLISH-133533341.HTML |

CASE 2 – VIDEO

| TARGET DEVICE | URLS OUTPUT |
| --- | --- |
| ANDROID | APP INSTALLED=> YAHOO://VIDEO/VIEW/141554585<br>APP NOT INSTALLED=> HTTP://NEWS.YAHOO.COM/VIDEO/FAMILY-39-DOG-CREDITED-SAVING-141554585.HTML |
| IOS | APP INSTALLED=> YAHOO://VIDEO/VIEW/141554585<br>APP NOT INSTALLED=> HTTP://NEWS.YAHOO.COM/VIDEO/FAMILY-39-DOG-CREDITED-SAVING-141554585.HTML |
| DESKTOP WITH BROWSER APP | HTTP://NEWS.YAHOO.COM/VIDEO/FAMILY-39-DOG-CREDITED-SAVING-141554585.HTML |

*Fig. 12*

SYSTEM AND METHOD FOR PROGRAMMATICALLY CREATING RESOURCE LOCATORS

FIELD OF THE DISCLOSURE

The present disclosure relates to resource identification, and more particularly to generating resource identifiers, such as uniform resource locators (URLs), programmatically.

BACKGROUND

Most, if not all, computing resources are accessed using an identifier. A resource may be accessed on the internet using a universal resource locator (URL), for example.

SUMMARY

A resource identifier typically identifies a location of the resource and a name, or other descriptive designation, of the resource. A resource identifier may identify any type of resource, including without limitation content, such as audio, video, multimedia, image, etc. content, a web page, a website's home page, and the like. A resource identifier identifying a resource accessible via the internet may be referred to as a web URL. A web URL may be generated using a protocol such as the Hypertext Transfer Protocol (HTTP), or other protocol. A resource identifier may also identify a resource that is native to a computing device, such as an application installed on the computing device. A URL used to access a native application may be referred to as a native URL. In some cases, a native URL may identify a native application and a web resource that is to be accessed using the native application. In most cases, a web URL and native URL used to access the same resource may have different formats. It would be beneficial to be able to programmatically generate a resource's web and/or native URL, so that the resource may be automatically and seamlessly made available for access by computing devices using different device hardware and/or software platforms.

The present disclosure seeks to address failings in the art and to programmatically generate a resource identifier, such as a universal resource locator (URL). In accordance with at least one embodiment of the present disclosure, one or more URLs may be generated using parts, e.g., decomposes parts, identified for an input URL. By way of a non-limiting example, a URL generated from the input URL may be a web URL, a native URL or both native and web URLs. By way of a further non-limiting example, an input URL might be an HTTP URL used in a web browser, e.g., a HTTP URL that is assigned by a web resource provider, and an output URL may include multiple native URLs for different client computing devices, such that each native URL is generated from the HTTP URL for a specific purpose and/or application. By way of yet another non-limiting example, the input URL might be a native URL which is decomposed into parts that are used to generate a web URL, e.g., a HTTP URL and/or one or more native URLs. In general, the input URL may be either a web or a native URL and the output URL may comprise one or more URLs, which output URLs may comprise a web URL and/or one or more native URLs. The web URL may be used by a web browser to access a resource identified by the input URL, and each native URL may be generated for use with a device type, such as an Android™, iOS™, etc. device, and may take into account a device's hardware and/or software configuration, including whether an app, or apps, is/are installed on the device.

In accordance with one or more embodiments, a method is provided, the method comprising accessing, by at least one computing device, a decomposition rules database storing a plurality of decomposition rules for decomposing universal resource locators (URLs) identifying device-accessible resources, the accessing comprising retrieving at least one decomposition rule for decomposing an input URL to generate the input URL's decomposed parts; and accessing, by the at least one computing device, a recomposition rules database storing a plurality of recomposition rules for generating recomposed web and native URLs, the accessing comprising retrieving at least one recomposition rule for generating at least one recomposed URL using the input URL's decomposed parts, the recomposed URL for use by at least one client computing device in accessing the device-accessible resource identified by the recomposed URL.

In accordance with one or more embodiments a system is provided, which system comprising at least one computing device, each computing device a processor and a storage medium for tangibly storing thereon program logic for execution by the processor, the stored program logic comprising accessing logic executed by the processor for accessing a decomposition rules database storing a plurality of decomposition rules for decomposing universal resource locators (URLs) identifying device-accessible resources, the accessing comprising retrieving at least one decomposition rule for decomposing an input URL to generate the input URL's decomposed parts; and accessing logic executed by the processor for accessing a recomposition rules database storing a plurality of recomposition rules for generating recomposed web and native URLs, the accessing comprising retrieving at least one recomposition rule for generating at least one recomposed URL using the input URL's decomposed parts, the recomposed URL for use by at least one client computing device in accessing the device-accessible resource identified by the recomposed URL.

In accordance with yet another aspect of the disclosure, a computer readable non-transitory storage medium is provided, the medium for tangibly storing thereon computer readable instructions that when executed cause at least one processor to access a decomposition rules database storing a plurality of decomposition rules for decomposing universal resource locators (URLs) identifying device-accessible resources, the accessing comprising retrieving at least one decomposition rule for decomposing an input URL to generate the input URL's decomposed parts; and access a recomposition rules database storing a plurality of recomposition rules for generating recomposed web and native URLs, the accessing comprising retrieving at least one recomposition rule for generating at least one recomposed URL using the input URL's decomposed parts, the recomposed URL for use by at least one client computing device in accessing the device-accessible resource identified by the recomposed URL.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an overview of components used in accordance with one or more embodiments of the present disclosure.

FIG. 2 provides a decomposition example in accordance with one or more embodiments of the present disclosure.

FIG. 3 provides input and output examples for rules A and B used in the decomposition example of FIG. 2.

FIG. 4 provides a decomposition process flow example for use in accordance with one or more embodiments.

FIG. 5 provides an example of an input URL, a domain decomposition rule for use in decomposing an input URL and decomposed parts generated from the domain decomposition processing in accordance with one or more embodiments of the present disclosure.

FIG. 6 provides an example of a regular expression decomposition rule performed following the domain decomposition rule of FIG. 5 in accordance with one or more embodiments of the present disclosure.

FIG. 7 provides a list of the decomposed parts generated from the input URL and decomposition rules of FIGS. 5 and 6 in accordance with one or more embodiments of the present disclosure.

FIG. 8 provides another example using another input URL processed using the domain decomposition rule of FIG. 5 and the regular expression decomposition rule of FIG. 6 in accordance with one or more embodiments of the present disclosure.

FIG. 9, which comprises FIGS. 9A and 9B, provides examples of parameters extracted using the input URL's decomposed parts in accordance with one or more embodiments of the present disclosure.

FIG. 10 provides a recomposition example in accordance with one or more embodiments of the present disclosure.

FIG. 11 provides examples of multiple URLs that may be output by the recomposition pipeline in accordance with one or more embodiments in connection with the decomposed URL parts identified for the input URL example shown in FIGS. 7 and 8.

FIG. 12 provides examples of multiple URLs that may be output by the recomposition pipeline in accordance with one or more embodiments in connection with the decomposed URL parts identified for the input URL examples shown in FIGS. 7 and 8.

FIG. 13 provides a process flow example for use in accordance with one or more embodiments.

DETAILED DESCRIPTION

Figure 1:
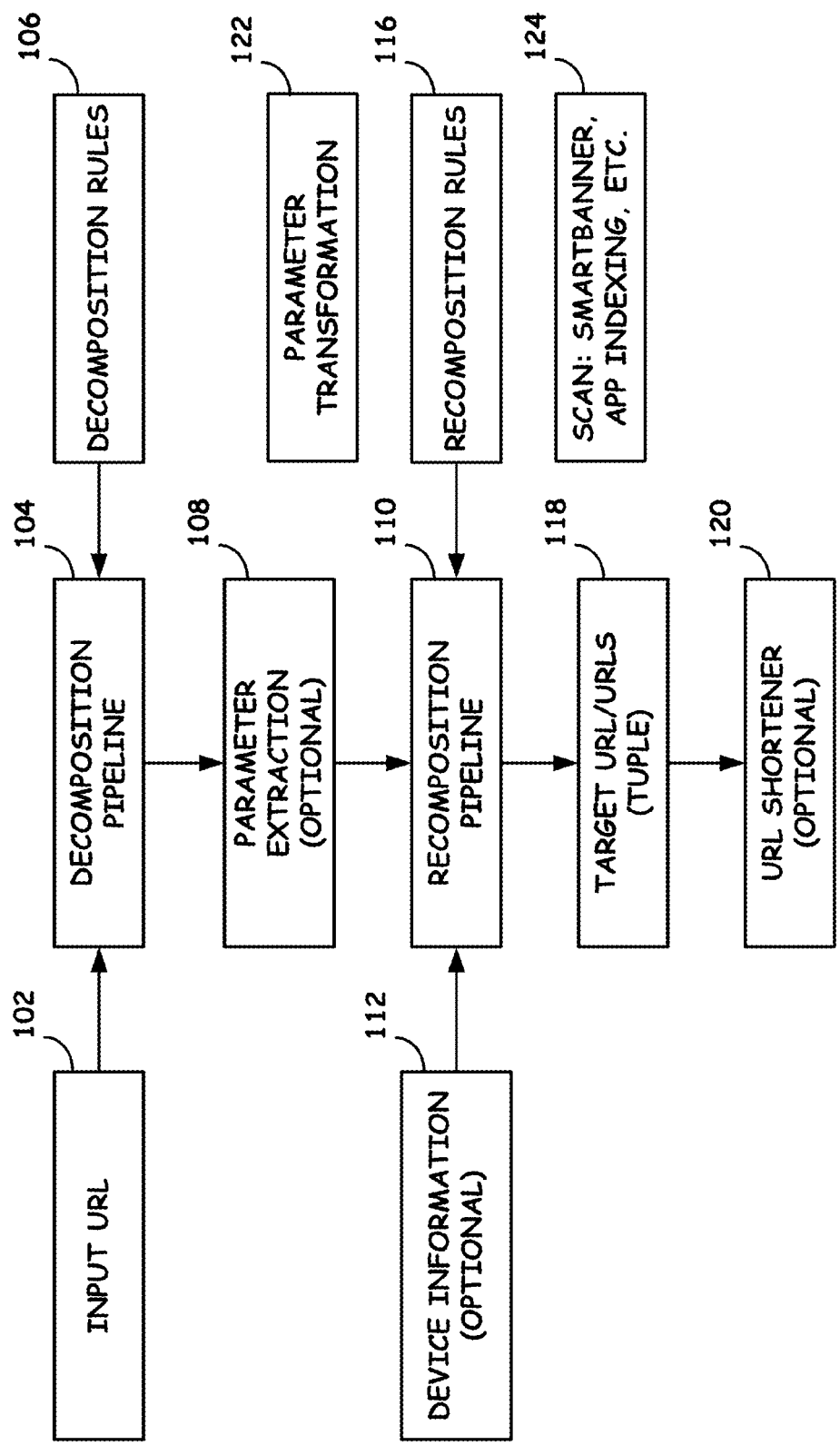

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a system, method and architecture for programmatically creating resource locators. Embodiments of the present disclosure programmatically create an output URL, such as a cross-device URL, given an input URL, such as an HTTP URL. Embodiments of the present disclosure receive an input URL and creates an output URL. The input and output URLs may take any form. Embodiments of the present disclosure apply one or more decompositions to an input URL to programmatically create an output URL. In accordance with one or more embodiments, a decomposition may be represented by one or more decomposition rules. In accordance with one or more embodiments, a computing pipeline, which may be referred to herein as a decomposition pipeline, may be used to programmatically create an output URL from an input URL. Along the computing pipeline, output from one pipeline processing stage may be passed to another processing stage. Each pipeline processing stage may be implemented by one or more processing units, one or more computing devices, etc. A pipeline processing stage may use one or more decomposition rules to generate output.

FIG. 1 provides an overview of components used in accordance with one or more embodiments of the present disclosure. Decomposition pipeline 104 receives as input a source, or input, URL 102 and one or more decomposition rules 106. By way of some non-limiting examples, source URL 102 might be a web URL, such as an HTTP URL used by a web browser, or it might be a URL other than an HTTP URL, such as a native URL used by an application other than a web browser. In accordance with one or more embodiments, decomposition pipeline 104 may comprise one or more decomposition stages, each of which may use one or more decomposition rules 106. Decomposition rules 106 may be stored in one or more databases, or decomposition rules databases.

In accordance with one or more embodiments, a decomposition rule may be used to process the input URL 102, which may comprise parsing the URL 102 to generate output comprising one or more decomposed parts and a confidence level. The confidence level may indicate whether or not additional decomposition would be beneficial or needed. The confidence level may be generated by the rule, and may be an indicator of whether the input URL 102 has been sufficiently decomposed.

Figure 2:
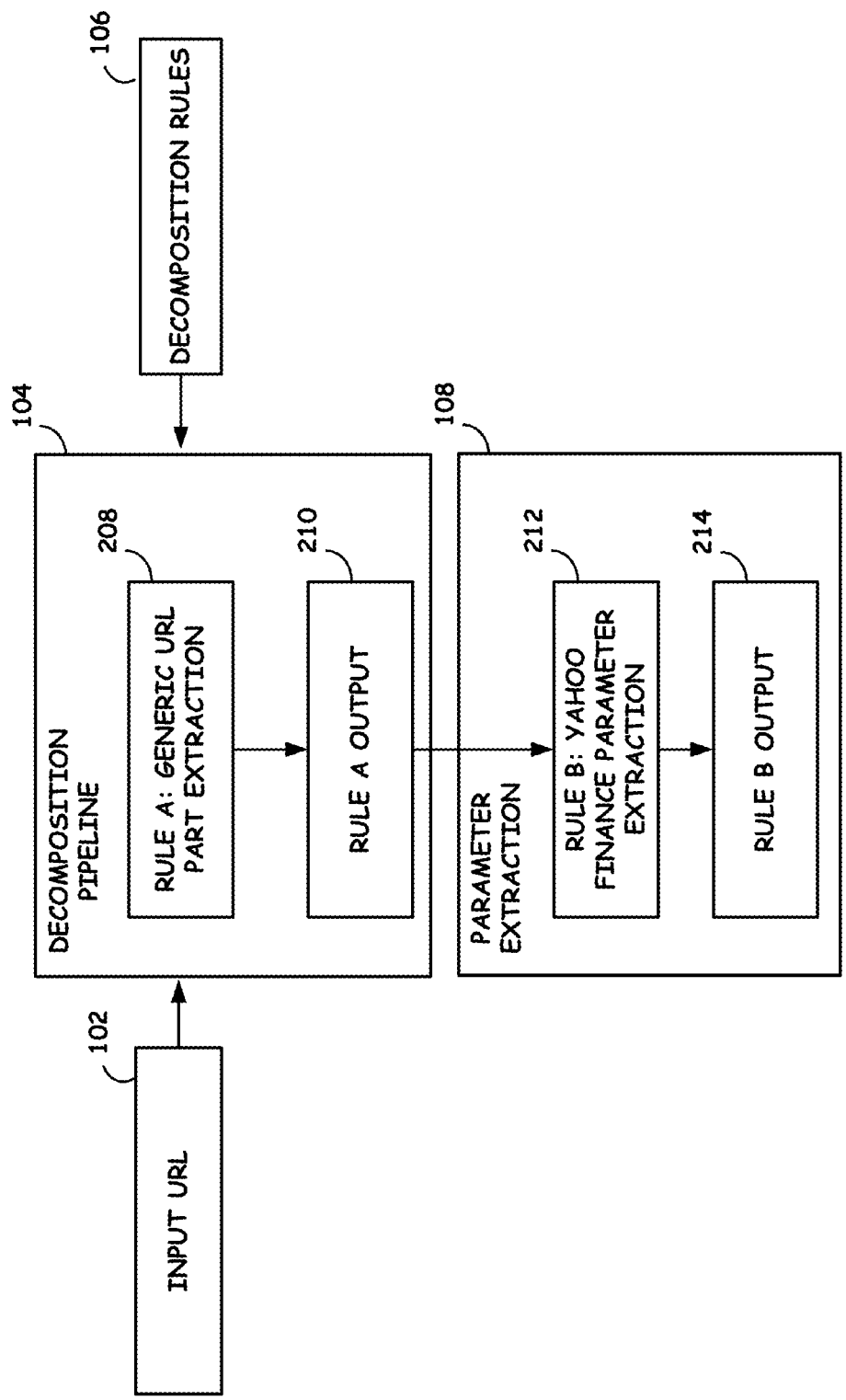

FIG. 2 provides a decomposition example in accordance with one or more embodiments of the present disclosure. In the example shown in FIG. 2, an input URL 102 comprises a web URL specified using HTTP. URL 102 may be used by a web browser, for example. By way of a non-limiting example, the source URL might be http://finance.yahoo.com/q?s=YHOO. A decomposition pipeline 104 used in the example of FIG. 2 comprises rule A of decomposition rules 106. Rule A may be used to parse the input URL 102 and generate output 210. By way of a non-limiting example, rule A may process input URL 102 to extract information from the input URL 102, such as and without limitation protocol, host, path and parameter items of information. Such items of information may be referred to as decomposed parts of input URL 202. Rule A may output the extracted information, which output may be used by Rule B in parameter extraction 108 processing of the input URL 102, which generates output 214. In FIG. 2, rules A and B are referenced using reference numerals 208 and 212, respectively.

FIG. 3 provides input and output examples for rules A and B used in the decomposition example of FIG. 2. Input 302 provides an example of the input provided to rule A, which includes the input URL 102. In the example shown in FIGS. 2 and 3, rule A does not receive input values from processing performed in connection with a previous rule, e.g., rule A is the first rule used the decomposition pipeline 104 in connection with input URL 102. Output 302 provides examples of output 210 that may be generated in rule A processing. The output generated from rule A processing may be input to rule B processing.

In the example shown in FIGS. 2 and 3, rule A processing may also generate a confidence level. In the example, rule A processing may output a confidence level of low indicating that further processing is beneficial for the input URL 102. By way of a non-limiting example, rule A may output a confidence level of low so that rule B processing is performed using rule A's output. In the example of FIG. 2, rule B uses the input URL 202 and the output 304 to generate output 308 as an example of the output 214 generated by rule B. The output 308 may comprise parameters extracted from input URL 102, e.g., using the path and symbol output generated by rule A. In the example shown in FIG. 3, input 306 to rule B processing includes the input URL 102 and the output values from output 304. Rule B processing may use the input 306 to generate output 308, which includes parameters, such as a content type, e.g., stock quote, and a symbol, e.g., YHOO, associated with the content type. Output 304 and 308 may comprise decomposed parts generated using the input URL 102.

Like rule A processing, processing in connection with rule B may comprise an assessment to determine whether to perform further processing of the input URL 102. In making such an assessment, a determination may be made that one or more additional rules may be used to provide further parsing and processing of the input URL 102. In the example of FIGS. 2 and 3, the processing provided in connection with rule B provided output in addition to that provided by rule A. By way of a non-limiting example, rule A may determine that it is unable to process a portion, or portions, of the input URL 102 and set the confidence level to low as an indicator of such a determination. By way of a further non-limiting example, rule B may determine that there is no further processing needed for input URL 102 and may output a confidence level of high as an indicator of such a determination.

In accordance with one or more embodiments, a determination whether or not further processing is to be performed may be made by a separate process, e.g., an annotation process. The annotation process may be used to determine whether further processing is to be performed and/or which rule is to be used next if a determination is made, by the annotation process or a rule process, that further rule processing is to be performed. By way of a non-limiting example, rule A and/or another process, such as an annotation process, may be configured to check the output values 304 and identify which rule is to be processed after rule A. In the example shown in FIGS. 2 and 3, the path=/q and s=YHOO information extracted from input URL 102 may be used to identify rule B to process the information. In so doing, a chain of rules may be dynamically created on the fly using information obtained while processing an input URL.

Parameter extraction 108, which may be optional, may analyze parts of the URL 102 extracted by decomposition rules 106 in the decomposition pipeline 104 to determine whether or not the parts may be parameterized for targeted actions. In the example shown in FIG. 3, rule B output includes parameters indicating a stock quote content type and the stock symbol YHOO. Parameter extraction 108 may use the content type and stock symbol information to specify an action=quote and symbol=YHOO.

Referring again to FIG. 1, recomposition pipeline 110 may use recomposition rules 116 and parts of URL 102 determined by the decomposition pipeline and optionally the parameter extraction 108 to generate one or more target URLs 118. Recomposition pipeline 110 may optionally use information about the device in determining which recomposition rules 116 to use in the recomposition pipeline 110. Device information 112 may comprise information identifying the device, such as device manufacturer, model number, serial number, etc. Device information may further comprise platform configuration information, such as hardware configuration and software configuration. Software configuration information may comprise operating system and/or installed application(s) information, for example.

In accordance with one or more embodiments, decomposition rules 106 and recomposition rules 116 may be stored using one or more databases of rules. A decomposition rule may define a URL pattern for decomposing a URL into its component, or decomposed, parts. A recomposition rule may define a URL pattern for recomposing a URL from component, or decomposed, parts. Decomposition rules 106 and/or recomposition rules 116 may be stored in one or more centralized data stores for access by a server computing device, a client computing device, or both. In accordance with one or more embodiments, a client computing device may retrieve decomposition rules 106 and/or recomposition rules 116 from a data store that is local or remote with respect to the client computing device, and the client computing device 104 may implement the decomposition pipeline 104 and/or the recomposition pipeline 110, and may optionally perform parameter extraction 108. Similarly and in accordance with one or more embodiments, one or more server computing devices may be used to implement the decomposition pipeline 104 and/or the recomposition pipeline 110, and may optionally perform parameter extraction 108.

Parameter transformation 122 may be performed to transform a parameter from one form to another form. By way of a non-limiting example, a news article may have an article identifier that differs depending on whether the news article is accessed from the provider's web site using a browser application or from another application, e.g., the provider's news app, and parameter transformation 122 may be used transform the article identifier from the web site version to the app version, or vice versa. By way of a further non-limiting example, parameter transformation 122 may make a network call to a server, e.g., a server provided by the provider of the news article, which is able to generate the different versions of the parameter, e.g., article identifier parameter.

Scan component 124 may be used to identify alternative URLs, which may be used for different platforms and/or applications. Scan component 124 may be configured to search for alternate URL versions of a given URL, and to generate a mapping between the URLs, e.g., the given and alternate URLs. By way of a non-limiting example, scan component 124 may scan a web article, or other web content such as a web page, for a banner, or other content, which contains alternate versions of the content's URL. The alternate URL versions may be versions for different devices and/or applications. By way of a further non-limiting example, an initial page provided by LinkedIn™ to a smartphone web browser may display a banner prompting the user to install the LinkedIn™ app on the smartphone; such a banner may be scanned by scan component 124 to find the LinkedIn™ native app URL that corresponds to the website URL for LinkedIn™. Scan component 124 may associate the web URL used by the browser on the smartphone and any alternate, e.g., native, URL corresponding to the web URL.

Target URLs 118 may be provided to a requester, e.g., a computing device requesting a recomposed, or reconstituted, URL. Alternatively, target URLs may be forwarded to another component, such as URL shortener 120, which may optionally be used to generate another URL from the recomposed URL, such as a shortened version of the URL, which may represent a deep link. The shortened URL may be returned to the requester. In accordance with one or more embodiments, URL shortener 120 may be used to identify an appropriate URL given the platform in which the shortened URL is invoked. By way of a non-limiting example, when invoked, the shortened URL may be used, e.g., on a user's smartphone, to access a mobile app and/or place/position within the mobile app, to access an app store, iTunes™ or Google Play™, to download an app if the app indicated by the shortened URL is not installed on the user's mobile device, or display a web page in a browser app based on the shortened URL.

Figure 4:
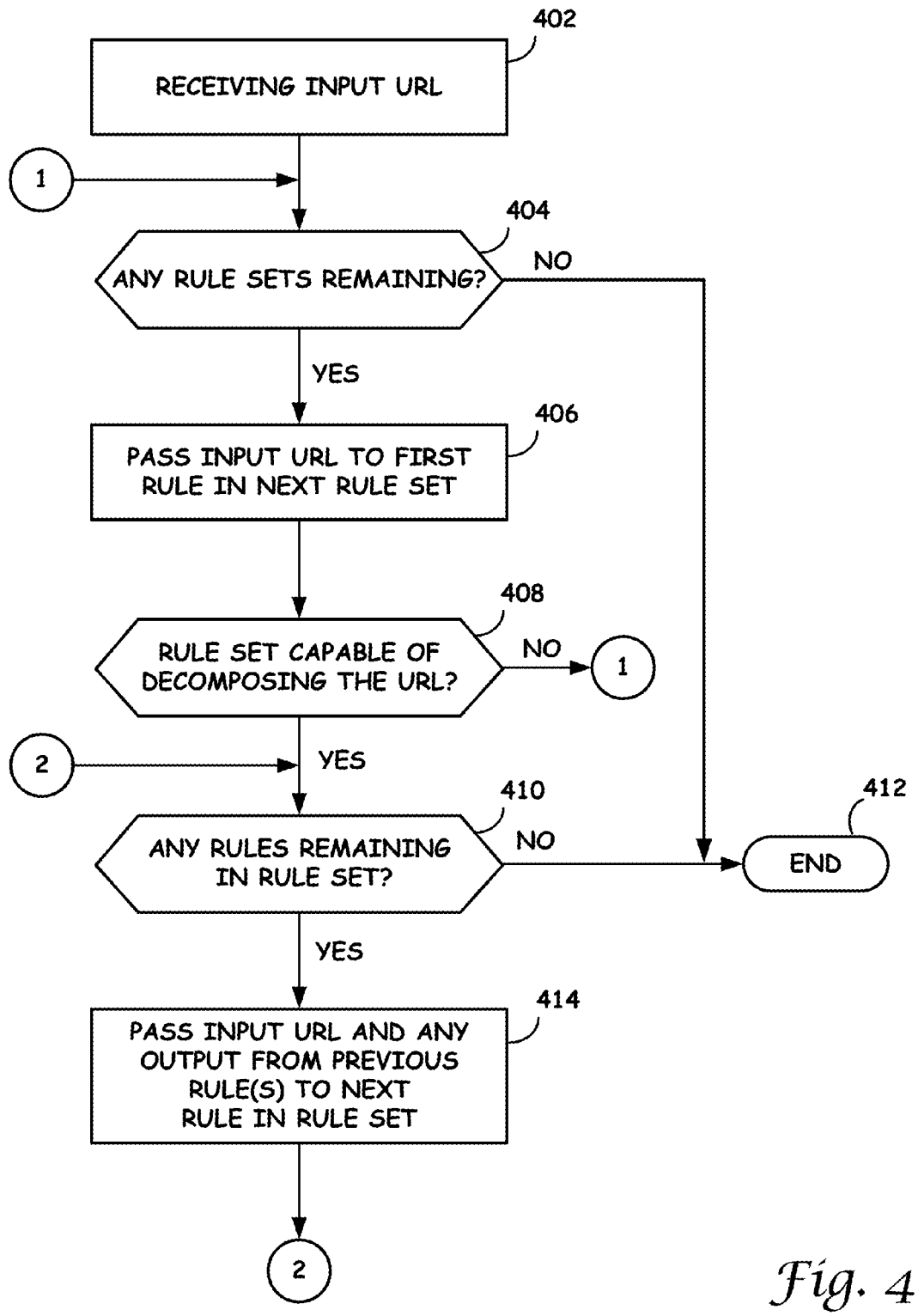

FIG. 4 provides a decomposition process flow example for use in accordance with one or more embodiments. In accordance with one or more embodiments, the process flow of FIG. 4 may include processing by decomposition pipeline 104, which uses decomposition rules 106 and input URL 102, and may optionally include parameter extraction 108.

In the example of FIG. 4, a pipeline, such as pipeline 104, may comprise one or more rule sets, each of which may comprise one or more rules. At step 402, an input URL, e.g., input URL 102, is received, and processing continues at step 404 to determine whether or not a rule set exists for decomposing the input URL. In the example of FIG. 4, a rule set may comprise one or more decomposition rules. At step 404, a determination is made whether any rule sets remain to be processed. If not, processing ends at step 412. If it is determined, at step 404, that at least one rule set remains to be processed, processing continues at step 406 to pass the input URL to the first rule in the next rule set. By way of a non-limiting example, the input URL is passed to the first rule in the rule set, and the first rule in the rule set determines whether the it and/or the rule set is capable of decomposing the input URL. By way of a further non-limiting example, the first rule may generate a flag indicating whether it is capable of decomposing the input URL.

At step 408, a determination is made whether the rule set is capable of decomposing the input URL. By way of a non-limiting example, the flag generated by the first rule may be examined to determine whether the rule set is capable of decomposing the input URL. If it is determined, at step 408, that the rule set is incapable of decomposing the input URL, processing continues at step 404 to process any remaining rule sets. If it is determined, at step 408, that the rule set is capable of decomposing the input URL, processing continues at step 410 to use the rules in the current rule set to decompose the input URL.

At step 410, a determination is made whether there are any rules remaining in the rule set. If not, processing ends at step 412. If it is determined, at step 410, that there are rules remaining in the rule set, processing continues at step 414 to pass the input URL and any output from the previous rule(s) to the next rule in the rule set. Processing continues at step 410 to decompose the input URL using any remaining rules in the rule set. FIG. 4 will now be discussed in connection with some examples.

FIG. 5 provides an example of an input URL, a domain decomposition rule for use in decomposing the input URL and decomposed parts generated from the domain decomposition processing in accordance with one or more embodiments of the present disclosure. In the example shown in FIG. 5, the input URL is processed using a domain decomposition rule, which examines the input URL to determine whether it is capable of decomposing the input URL by determining whether the input URL specifies the yahoo.com domain. Since, in the example, the input URL specifies the yahoo.com domain, the domain decomposition rule returns a true value indicating that it is able to decompose the input URL. In the example of FIG. 5, the domain decomposition rule decomposes the input URL into scheme, host, domain, subdomain and path parts, each of which have an associated value, which is shown in the example. A column is included in the example of FIG. 5 for illustration purposes and provides a description of each of the decomposed parts. For example, the scheme part represents a URL scheme, the host part represents a URL host, the domain part represents a second level domain name from the host, they subdomain part represents a subdomain part from the host, and the path represents a URL path.

FIG. 6 provides an example of a regular expression decomposition rule performed following the domain decomposition rule of FIG. 5 in accordance with one or more embodiments of the present disclosure. In the example of FIG. 6, the regular expression decomposition rule uses a regular expression, such as that shown in the example, to decompose the input URL into additional parts. The regular expression decomposition rule may check if the domain name is yahoo.com, the subdomain is news, and the scheme is HTTP or HTTPS in order to determine whether it is able to process the input URL, and may return a flag, or other indicator, based on its determination. The regular expression provided in the example of FIG. 6 determines a type of the content represented by the input URL, an alias for the content, and an identifier for the content. According to the regular expression, a default type, e.g., article, is used if a type is not specified in the input URL. The regular expression may be used to parse the input URL to extract the alias and ID parts for the input URL. The ID may be an internal identifier used by the content provider to identify the content, e.g., a content identifier used by the provider's server, and the alias may be an external identifier. FIG. 7 provides a list of the decomposed parts generated from the input URL and decomposition rules of FIGS. 5 and 6 in accordance with one or more embodiments of the present disclosure.

FIG. 8 provides another example using another input URL processed using the domain decomposition rule of FIG. 5 and the regular expression decomposition rule of FIG. 6 in accordance with one or more embodiments of the present disclosure. A check using the domain name decomposition and regular expression decomposition rules indicates that the input URL uses the yahoo.com domain, and a check using the regular expression decomposition rule, further indicates that the input URL uses the HTTP scheme and the news subdomain. In the example shown in FIG. 8, the input URL includes a content type, e.g., video, which is identified using the regular expression decomposition rule of FIG. 6. The decomposed parts of the input URL include a scheme, host, domain, subdomain, path, type, alias and ID, which are generated in the processing of the domain name and regular expression decomposition rules.

In accordance with one or more embodiments, parameter extraction, such as that performed by parameter extraction 108, may be optionally performed on an input URL to generate one or more parts for inclusion in an input URL's decomposed parts. The parameters may identify targeted actions. FIG. 9, which comprises FIGS. 9A and 9B, provides examples of parameters extracted using the input URL's decomposed parts in accordance with one or more embodiments of the present disclosure. FIG. 9A corresponds to the input URL shown in FIGS. 5, 6 and 7, and FIG. 9B corresponds to the input URL shown in FIG. 8. In accordance with one or more embodiments, parameter extraction 108 may comprise a specialized subsystem that analyzes an input URL, and its decomposed parts, and determines whether they can be parameterized for targeted actions. If so, the parameter extraction 108 outputs each parameter and an associated value. In the example shown in FIG. 9, each input URL is assigned a targeted view action indicating an action that may be performed in connection with the input URL. In the example of FIG. 3, parameter extraction 108 may be used to assign a targeted action of quote in connection with the input URL.

As discussed herein, in accordance with one or more embodiments, decomposed parts of a URL, which decomposed parts may include one or more parameters, may be input to recomposition pipeline 110. The input provided to recomposition pipeline 110 may optionally include device information 112. FIG. 10 provides a recomposition example in accordance with one or more embodiments of the present disclosure. In the example shown in FIG. 10, the device information indicates that the device that will be using the recomposed URL is an Android™ device with a Yahoo!™ application native to the device. According to the example of FIG. 10, the recomposition rule uses a URL template to generate a native URL for the Yahoo!™ application corresponding to the input URLs in the examples of FIGS. 7 and 8, which have parameters shown in FIGS. 9A and 9B, respectively. In the first recomposition example shown in FIG. 10, the values for the type, action, and article_ID parameters from FIG. 9A may be used to replace the {type}, {action} and {article_ID} components of the recomposition rule. In the second recomposition example shown in FIG. 10, the values from the type, action, and article_ID parameters from FIG. 9B may be used to replace the {type}, {action} and {article_ID} components of the recomposition rule.

In accordance with one or more embodiments, multiple URLs may be generated for a number of different devices in a case that device information is either missing or indicates that a URL is to be generated for the multiple devices. FIG. 11 provides examples of multiple URLs that may be output by the recomposition pipeline 110 in accordance with one or more embodiments in connection with the decomposed URL parts identified for the input URL example shown in FIGS. 7 and 8. In case 1 shown in FIG. 11, a native URL template, such as that shown in FIG. 10, is used to generate URL output using the decomposed parts for the input URL shown in FIG. 7. As discussed above in connection with FIGS. 9 and 10, the native URL template may use parameters determined in connection with the input URL by parameter extraction 108. As shown in the example of FIG. 11, and input URL's decomposed parts, including the parameters, may also be used with a web URL template to generate web URL output for the input URL shown in FIG. 7. In case 2 shown in FIG. 11, the native URL and web URL templates are used to generate native and web URL output using the decomposed parts, including the parameters, determined for the input URL shown in FIG. 8.

In accordance with one or more embodiments, URLs may be generated for a number of different devices and/or device platforms by the recomposition pipeline 104. FIG. 12 provides examples of multiple URLs that may be output by the recomposition pipeline in accordance with one or more embodiments in connection with the decomposed URL parts identified for the input URL examples shown in FIGS. 7 and 8. In the example shown in FIG. 12, multiple URLs may be output for multiple target devices, such as Android™, iOS™, and desktop computing devices. In the case of the Android™ and iOS™ devices, a different URL may be output depending on whether an app is installed on the device. In a case that an app is determined to be installed on the device, a native URL template, such as that shown in FIG. 10, may be used to generate the output URL. In a case that the app is determined to be absent from the device, a web URL template, such as that shown in FIG. 11, may be used to generate a web URL as an output URL. Case 1 shown in FIG. 12, a native URL template, such as that shown in FIG. 10, may be used to generate native URL output using the decomposed parts, including the parameters, for the input URL shown in FIG. 7. As shown in the example of FIG. 11, and input URL's decomposed parts, including the parameters, may also be used with a web URL template to generate web URL output for the input URL shown in FIG. 7. In case 2 shown in FIG. 12, the native URL and web URL templates may be used to generate native and/or web URL output using the decomposed parts, including the parameters, determined for the input URL shown in FIG. 8.

Figure 13:
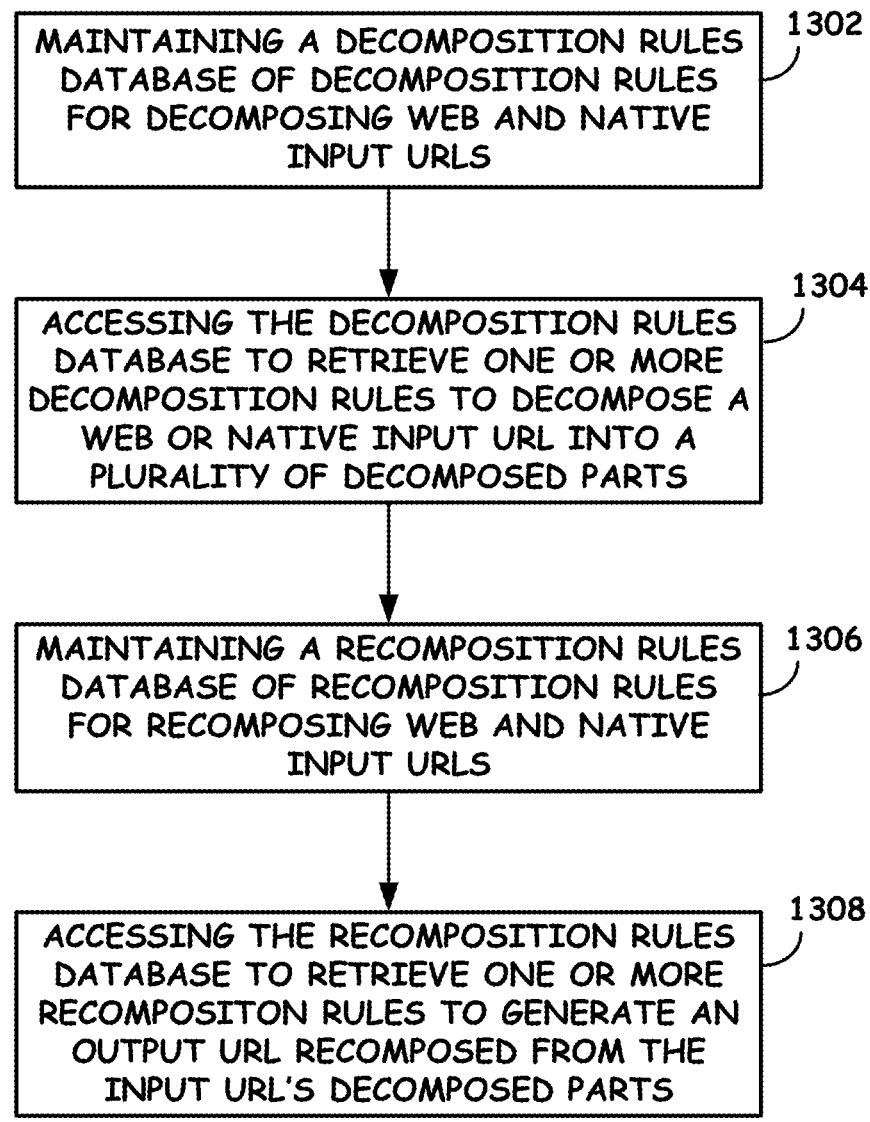

FIG. 13 provides a process flow example for use in accordance with one or more embodiments. The process flow may be executed by at least one computing device, such as and without limitation at least one server computing device, at least one client computing device or some combination of server and client computing devices.

At step 1302, a decomposition rules database is maintained, which comprises a plurality of decomposition rules for use in decomposing input URLs, which URLs may comprise both web and native URLs. The URLs may identify device-accessible resources, such as and without limitation network-accessible resources and or resources native to a computing device, including without limitation software applications installed on the computing device. The network-accessible resources may include without limitation resources accessible via the internet or other computer communications network.

At step 1304, the decomposition rules database may be accessed to retrieve one or more decomposition rules to decompose an input URL, which may be a web URL or a native URL, into a plurality of decomposed parts.

At step 1306, a recomposition rules database is maintained. The recomposition rules database may comprise a plurality of recomposition rules for use in generating recomposed web and native URLs. The plurality of recomposition rules may be used to generate one or more output, or recomposed, URLs. The one or more output URLs may comprise one or more web and/or native URLs recomposed using one or more decomposed parts generated from an input URL. The recomposed URL is for use by at least one client computing device in accessing the device-accessible resource identified by the recomposed URL. The resource identified by the recomposed URL may identify a resource identified by the input URL.

In accordance with one or more embodiments, the decomposed parts may include at least one parameter generated using at least one decomposition rule and an input URL. By way of some non-limiting examples, the at least one parameter may identify a content type for the resource identified by the input URL and/or may identify an action associated with the resource identified by the input URL.

In accordance with one or more embodiments, the output URL may comprise at least one output URL generated using information about a client computing device that is to use the output URL. In a case that device information is not available for the client computing device, embodiments of the present disclosure may generate multiple output URLs to accommodate different client computing devices, from which the client computing device may select one to use to access the resource identified by the multiple URLs. In accordance with one or more embodiments, the multiple URLs may comprise one or more web URLs and/or one or more native URLs.

In accordance with one or more embodiments, the recomposition rules and/or the decomposition rules may be defined by a resource provider, by an engineer, learned using machine learning, identified by scanning the web, etc.

Figure 14:
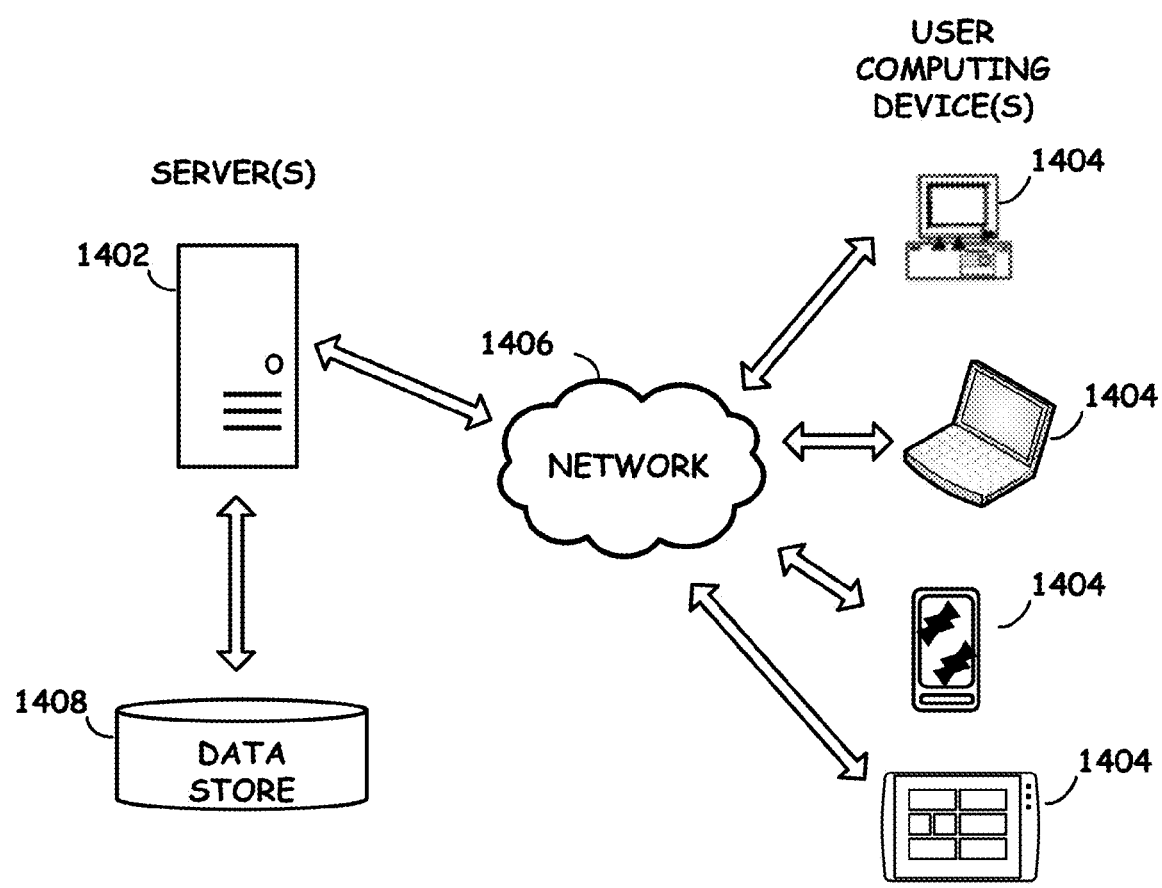
FIG. 14 illustrates some components that can be used in connection with one or more embodiments of the present disclosure.

FIG. 14 illustrates some components that can be used in connection with one or more embodiments of the present disclosure. In accordance with one or more embodiments of the present disclosure, one or more computing devices, e.g., one or more server computing devices, client computing devices or other computing device, are configured to comprise functionality described herein. For example, a computing device 1402 and/or a computing device 1404 may be configured to execute program code, instructions, etc. to provide functionality in accordance with one or more embodiments of the present disclosure.

Computing device 1402 can serve content to user computing devices 1404 using a browser application, or other application native to the computing device 1402, via a network 1406. Data store 1408 can be used to store program code to configure a server 1402 to functionality in accordance with one or more embodiments of the present disclosure. Data store 1408 may store one or more databases, which may comprise one or more decomposition rules databases and/or one or more recomposition rules databases. Server 1402 may provide program code and/or one or more rules databases to one or more of the client computing devices 1404. Client computing device 1404 may store program code to configure it to perform functionality in accordance with one or more embodiments of the present disclosure, and may store one or more rules databases, or some portion of one or more rules databases. Client computing device 1404 may comprise one or more native applications, each of which may be installed on the client computing device 1404. In accordance with one or more embodiments, a native application may be invoked using a native URL. The native URL may further be used to access a web resource, such as a resource accessible over the internet and/or other computing network.

The user computing device 1404 may be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1402 and the user computing device 1404 can include one or more processors, memory, a removable media reader, network interface, display and interface, and one or more input devices, e.g., keyboard, keypad, mouse, etc. and input device interface, for example. One skilled in the art will recognize that server 1402 and user computing device 1404 may be configured in many different ways and implemented using many different combinations of hardware, software, or firmware.

In accordance with one or more embodiments, a computing device 1402 can make a user interface available to a user computing device 1404 via the network 1406. The user interface made available to the user computing device 1404 can include content items, or identifiers (e.g., URLs) selected for the user interface in accordance with one or more embodiments of the present invention. In accordance with one or more embodiments, computing device 1402 makes a user interface available to a user computing device 1404 by communicating a definition of the user interface to the user computing device 1404 via the network 1406. The user interface definition can be specified using any of a number of languages, including without limitation a markup language such as Hypertext Markup Language, scripts, applets and the like. The user interface definition can be processed by an application executing on the user computing device 1404, such as a browser application, to output the user interface on a display coupled, e.g., a display directly or indirectly connected, to the user computing device 1404.

In an embodiment the network 1406 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 14. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 15:
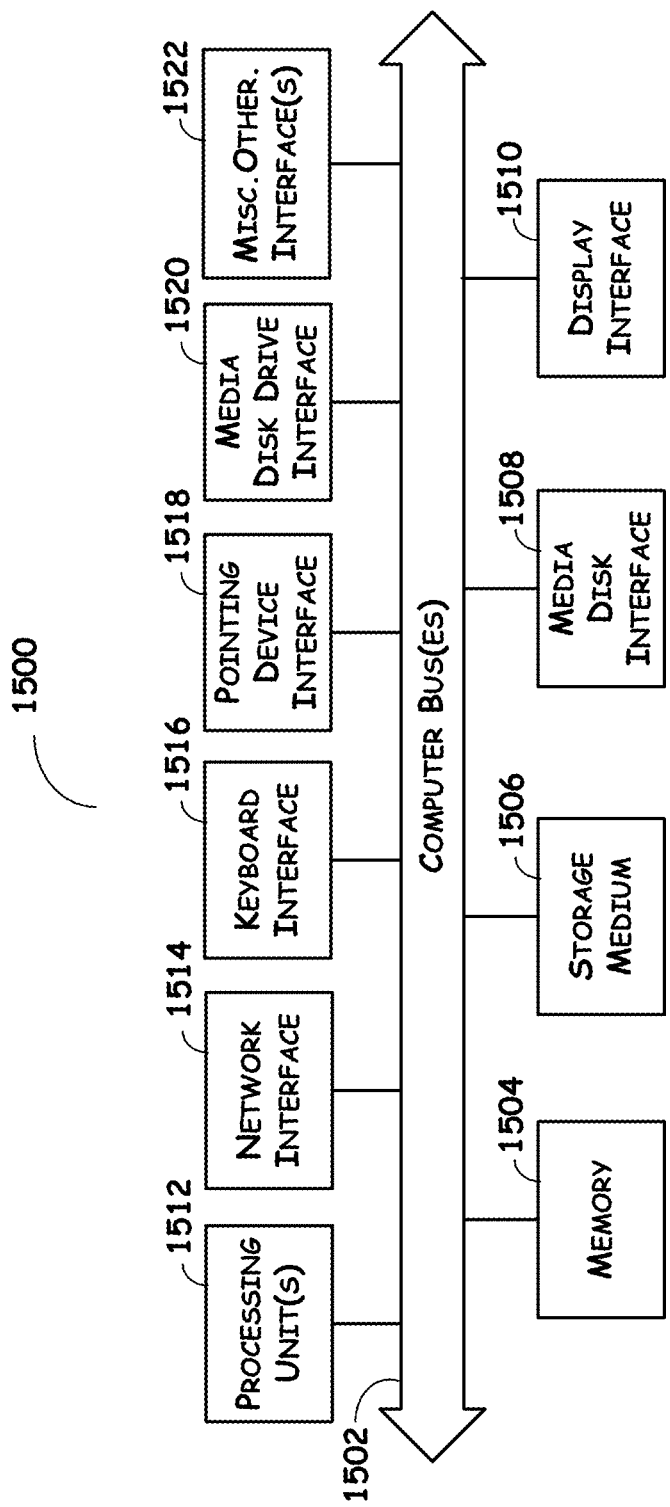
FIG. 15 is a detailed block diagram illustrating an internal architecture of a computing device in accordance with one or more embodiments of the present disclosure.

FIG. 15 is a detailed block diagram illustrating an internal architecture of a computing device, e.g., a computing device such as server 1402 or user computing device 1404, in accordance with one or more embodiments of the present disclosure. As shown in FIG. 15, internal architecture 1500 includes one or more processing units, processors, or processing cores, (also referred to herein as CPUs) 1512, which interface with at least one computer bus 1502. Also interfacing with computer bus 1502 are computer-readable medium, or media, 1506, network interface 1514, memory 1504, e.g., random access memory (RAM), run-time transient memory, read only memory (ROM), etc., media disk drive interface 1520 as an interface for a drive that can read and/or write to media including removable media such as floppy, CD-ROM, DVD, etc. media, display interface 1510 as interface for a monitor or other display device, keyboard interface 1516 as interface for a keyboard, pointing device interface 1518 as an interface for a mouse or other pointing device, and miscellaneous other interfaces not shown individually, such as parallel and serial port interfaces, a universal serial bus (USB) interface, and the like.

Memory 1504 interfaces with computer bus 1502 so as to provide information stored in memory 1504 to CPU 1512 during execution of software programs such as an operating system, application programs, device drivers, and software modules that comprise program code, and/or computer-executable process steps, incorporating functionality described herein, e.g., one or more of process flows described herein. CPU 1512 first loads computer-executable process steps from storage, e.g., memory 1504, computer-readable storage medium/media 1506, removable media drive, and/or other storage device. CPU 1512 can then execute the stored process steps in order to execute the loaded computer-executable process steps. Stored data, e.g., data stored by a storage device, can be accessed by CPU 1512 during the execution of computer-executable process steps.

Persistent storage, e.g., medium/media 1506, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   accessing, by at least one computing device, a decomposition rules database storing a plurality of decomposition rules for decomposing universal resource locators (URLs) identifying device-accessible resources, the accessing comprising retrieving at least one decomposition rule for decomposing an input URL to generate the input URL's decomposed parts;
   accessing, by the at least one computing device, a recomposition rules database storing a plurality of recomposition rules for generating recomposed URLs, the plurality of recomposition rules comprising a number of native URL templates for use in generating a number of recomposed native URLs and a number of web URL templates for use in generating a number of recomposed web URLs, the accessing comprising retrieving at least one recomposition rule from the recomposition rules database; and
   generating, by the at least one computing device, at least one recomposed URL using the input URL's decomposed parts and the retrieved at least one recomposition rule, each retrieved recomposition rule comprising one of a native URL template and a web URL template, each recomposed URL for use by at least one client computing device in accessing the device-accessible resource identified by the recomposed URL.

2. The method of claim 1, further comprising:
   using, by the at least one computing device, at least one decomposition rule to generate at least one parameter for inclusion in the input URLs decomposed parts.

3. The method of claim 2, the at least one parameter comprising a parameter identifying a content type of the resource identified by the input URL.

4. The method of claim 2, the at least one parameter comprising a parameter identifying an action associated with the resource identified by the input URL.

5. The method of claim 1, the input URL comprises a web URL formatted in accordance with a web protocol and the recomposed URL comprises at least one native URL formatted for use with a native application installed on the at least one client computing device.

6. The method of claim 1, further comprising:
   generating, by the at least one computing device, the at least one recomposed URL using the input URL's decomposed parts and device information of the at least one client computing device.

7. The method of claim 1, further comprising:
   determining, by the at least computing device, availability of device information for the at least one client computing device;
   if the device information is available, generating, by the at least one computing device, the at least one recomposed URL using the input URL's decomposed parts and device information of the at least one client computing device; and
   if the device information is unavailable, generating, by the at least one computing device, the at least one recomposed URL comprising multiple recomposed URLs using the input URL's decomposed parts, the multiple URLs comprising at least one web URL and at least one native URL.

8. The method of claim 1, the at least one computing device and the at least one client computing device are a same computing device.

9. The method of claim 1, the at least one computing device and the at least one client computing device are different computing devices.

10. The method of claim 9, the at least one computing device comprising at least one server computing device.

11. A system comprising:
at least one computing device, each computing device a processor and a storage medium for tangibly storing thereon program logic for execution by the processor, the stored program logic comprising:
accessing logic executed by the processor for accessing a decomposition rules database storing a plurality of decomposition rules for decomposing universal resource locators (URLs) identifying device-accessible resources, the accessing comprising retrieving at least one decomposition rule for decomposing an input URL to generate the input URL's decomposed parts;
accessing logic executed by the processor for accessing a recomposition rules database storing a plurality of recomposition rules for generating recomposed URLs, the plurality of recomposition rules comprising a number of native URL templates for use in generating a number of recomposed native URLs and a number of web URL templates for use in generating a number of recomposed web URLs, the accessing comprising retrieving at least one recomposition rule from the recomposition rules database; and
generating logic executed by the processor for generating at least one recomposed URL using the input URL's decomposed parts and the retrieved at least one recomposition rule, each retrieved recomposition rule comprising one of a native URL template and a web URL template, each recomposed URL for use by at least one client computing device in accessing the device-accessible resource identified by the recomposed URL.

12. The system of claim 11, the stored program logic further comprising:
using logic executed by the processor for using at least one decomposition rule to generate at least one parameter for inclusion in the input URLs decomposed parts.

13. The system of claim 12, the at least one parameter comprising a parameter identifying a content type of the resource identified by the input URL.

14. The system of claim 12, the at least one parameter comprising a parameter identifying an action associated with the resource identified by the input URL.

15. The system of claim 11, the input URL comprises a web URL formatted in accordance with a web protocol and the recomposed URL comprises at least one native URL formatted for use with a native application installed on the at least one client computing device.

16. The system of claim 11, the stored program logic further comprising:
generating logic executed by the processor for generating the at least one recomposed URL using the input URL's decomposed parts and device information of the at least one client computing device.

17. The system of claim 11, the stored program logic further comprising:
determining logic executed by the processor for determining availability of device information for the at least one client computing device;
generating logic executed by the processor for generating, if the device information is available, the at least one recomposed URL using the input URL's decomposed parts and device information of the at least one client computing device; and
generating logic executed by the processor for generating, if the device information is unavailable, the at least one recomposed URL comprising multiple recomposed URLs using the input URL's decomposed parts, the multiple URLs comprising at least one web URL and at least one native URL.

18. The system of claim 11, the at least one computing device and the at least one client computing device are a same computing device.

19. The system of claim 11, the at least one computing device and the at least one client computing device are different computing devices.

20. The system of claim 19, the at least one computing device comprising at least one server computing device.

21. A computer readable non-transitory storage medium for tangibly storing thereon computer readable instructions that when executed cause at least one processor to:
access a decomposition rules database storing a plurality of decomposition rules for decomposing universal resource locators (URLs) identifying device-accessible resources, the accessing comprising retrieving at least one decomposition rule for decomposing an input URL to generate the input URL's decomposed parts; and
access a recomposition rules database storing a plurality of recomposition rules for generating recomposed URLs, the plurality of recomposition rules comprising a number of native URL templates for use in generating a number of recomposed native URLs and a number of web URL templates for use in generating a number of recomposed web URLs, the accessing comprising retrieving at least one recomposition rule from the recomposition rules database; and
generate at least one recomposed URL using the input URL's decomposed parts and the retrieved at least one recomposition rule, each retrieved recomposition rule comprising one of a native URL template and a web URL template, each recomposed URL for use by at least one client computing device in accessing the device-accessible resource identified by the recomposed URL.

22. The computer readable non-transitory storage medium of claim 21, the instructions further comprising instructions to:
use at least one decomposition rule to generate at least one parameter for inclusion in the input URLs decomposed parts.

23. The computer readable non-transitory storage medium of claim 22, the at least one parameter comprising a parameter identifying a content type of the resource identified by the input URL.

24. The computer readable non-transitory storage medium of claim 22, the at least one parameter comprising a parameter identifying an action associated with the resource identified by the input URL.

25. The computer readable non-transitory storage medium of claim 21, the input URL comprises a web URL formatted in accordance with a web protocol and the recomposed URL comprises at least one native URL formatted for use with a native application installed on the at least one client computing device.

26. The computer readable non-transitory storage medium of claim 21, the instructions further comprising instructions to:
  generate the at least one recomposed URL using the input URL's decomposed parts and device information of the at least one client computing device.

27. The computer readable non-transitory storage medium of claim 21, the instructions further comprising instructions to:
  determine availability of device information for the at least one client computing device;
  if the device information is available, generate the at least one recomposed URL using the input URL's decomposed parts and device information of the at least one client computing device; and
  if the device information is unavailable, generate the at least one recomposed URL comprising multiple recomposed URLs using the input URL's decomposed parts, the multiple URLs comprising at least one web URL and at least one native URL.

28. The computer readable non-transitory storage medium of claim 21, the instructions are executed by the at least one client computing device.

29. The computer readable non-transitory storage medium of claim 21, the instructions are executed by at least one computing device different from the at least one client computing device.

30. The computer readable non-transitory storage medium of claim 29, the at least one computing device comprising at least one server computing device.

* * * * *